US012708919B2

(12) United States Patent
Komori

(10) Patent No.: US 12,708,919 B2
(45) Date of Patent: Aug. 18, 2026

(54) SUBSTRATE PROCESSING APPARATUS

(71) Applicant: SCREEN HOLDINGS CO., LTD., Kyoto (JP)

(72) Inventor: Jun Komori, Kyoto (JP)

(73) Assignee: SCREEN HOLDINGS CO., LTD. (JP)

( * ) Notice: Subject to any disclaimer, the term of this patent is extended or adjusted under 35 U.S.C. 154(b) by 465 days.

(21) Appl. No.: 18/366,252

(22) Filed: Aug. 7, 2023

(65) Prior Publication Data

US 2024/0075489 A1 Mar. 7, 2024

(30) Foreign Application Priority Data

Sep. 5, 2022 (JP) ................................ 2022-141076

(51) Int. Cl.
*B05B 13/04* (2006.01)
*B05B 12/00* (2018.01)
*B05D 1/02* (2006.01)

(52) U.S. Cl.
CPC ............ *B05B 13/04* (2013.01); *B05B 12/002* (2013.01); *B05D 1/02* (2013.01)

(58) Field of Classification Search
CPC .......... B05D 1/02; B05B 12/002; B05B 13/04
See application file for complete search history.

(56) References Cited

U.S. PATENT DOCUMENTS

2015/0090305 A1 4/2015 Wakiyama et al. ........... 134/153
2016/0351421 A1* 12/2016 Iwao .................. H10P 72/0424
2017/0200624 A1* 7/2017 Higashijima ....... H10P 72/0414
2017/0345689 A1 11/2017 Wakiyama et al.
2019/0049845 A1 2/2019 Yoshimura et al.
2020/0111715 A1* 4/2020 Naohara ............ H10P 72/0604
2022/0134390 A1 5/2022 Sawashima et al.

FOREIGN PATENT DOCUMENTS

JP 9-232211 A 9/1997
JP 2001-068402 A 3/2001
JP 2002-246292 A 8/2002
JP 2007-266553 A 10/2007
JP 2012-043836 A 3/2012
JP 2015-088734 A 5/2017
JP 2017-092240 A 5/2017
JP 2019-096640 A 6/2019
JP 2021-086994 A 6/2021
JP 2021-128959 A 9/2021
JP 2022-020735 A 2/2022
JP 2022-072072 A 5/2022

OTHER PUBLICATIONS

Extended European Search Report dated Feb. 2, 2024 issued in corresponding European Patent Application No. 23190731.2.

* cited by examiner

*Primary Examiner* — Vishal I Patel
(74) *Attorney, Agent, or Firm* — OSTROLENK FABER LLP

(57) ABSTRACT

A substrate processing apparatus includes a nozzle that supplies a processing liquid to a substrate, a mover that moves the nozzle between a supply position above a substrate and a waiting position outward of the substrate, a nozzle container that is located at the waiting position and contains the nozzle, a first exhaust flow path that guides a gas in a processing space in which a processing liquid is supplied to a substrate to an exhaust device, and a second exhaust flow path that guides a gas in the nozzle container to the first exhaust flow path.

6 Claims, 8 Drawing Sheets

SUBSTRATE PROCESSING APPARATUS

BACKGROUND

Technical Field

The present invention relates to a substrate processing apparatus and relates to a substrate processing apparatus that processes a substrate using a processing liquid, in particular.

Description of Related Art

As a conventional substrate processing apparatus, there is a development device that performs development processing on a photosensitive film using a processing liquid such as a development liquid. In a case in which the development liquid has a strong odor, when an atmosphere including the development liquid leaks out of the development device, comfort of a working environment outside of the development device is degraded. Therefore, it is required to suppress leakage of the atmosphere including the development liquid in the development device.

For example, a development device described in JP 2017-092240 A has a nozzle for discharging a development liquid, a processing chamber for processing a substrate and a waiting pod. The nozzle is configured to be movable between a processing position above the substrate in the processing chamber and a waiting position at which the substrate is contained in the waiting pod. The processing liquid is discharged from the nozzle in each of the processing chamber and the waiting pod. Therefore, an exhaust flow path is provided in each of the processing chamber and the waiting pod.

SUMMARY

However, in the development device according to JP 2017-092240 A, because the exhaust flow path is provided in each of the processing chamber and the waiting pod, an amount of gas exhausted from the processing chamber and the amount of gas exhausted from the waiting pod must be managed separately. Therefore, there is a problem that it is difficult to control an exhaust amount of the development device as a whole.

An object of the present invention is to provide a substrate processing apparatus an exhaust amount of which as a whole is easily regulated.

A substrate processing apparatus according to one aspect includes a nozzle that supplies a processing liquid to a substrate, a mover that moves the nozzle between a supply position above a substrate and a waiting position outward of the substrate, a nozzle container that is located at the waiting position and contains the nozzle, a first exhaust flow path that guides a gas in a processing space in which a processing liquid is supplied to a substrate to an exhaust device, and a second exhaust flow path that guides a gas in the nozzle container to the first exhaust flow path.

With the present invention, it is possible to easily regulate an exhaust amount of an apparatus as a whole.

Other features, elements, characteristics, and advantages of the present disclosure will become more apparent from the following description of preferred embodiments of the present disclosure with reference to the attached drawings.

DETAILED DESCRIPTION

A substrate processing apparatus according to embodiments of the present invention will be described below with reference to the drawings. In the following description, a substrate refers to a substrate for an FPD (Flat Panel Display) that is used for a liquid crystal display device, an organic EL (Electro Luminescence) display device or the like, a semiconductor substrate, a substrate for an optical disc, a substrate for a magnetic disc, a substrate for a magneto-optical disc, a substrate for a photomask, a ceramic substrate, a substrate for a solar cell or the like.

A development device will be described as one example of the substrate processing apparatus. A substrate to be subjected to development processing in the present embodiment has a main surface and a back surface. Further, in the development device according to the present embodiment, with the main surface of a substrate directed upwardly and the back surface of the substrate directed downwardly, the back surface (lower surface) of the substrate is held, and development processing is performed on the main surface (upper surface) of the substrate.

A photosensitive film on which exposure processing has been performed is formed at least in the center portion of the main surface of the substrate. This photosensitive film is a negative photosensitive polyimide film, for example. As a development liquid for dissolving the exposed negative photosensitive polyimide film, an organic solvent including cyclohexanone, cyclopentanone or the like is used. As a rinse liquid, an organic solvent including isopropyl alcohol, propylene glycol monomethyl ether acetate (PGMEA) or the like is also used.

In the present embodiment, "development processing for a substrate" means dissolution of part of a photosensitive film by supply of a development liquid to the photosensitive film which is formed on a main surface of a substrate and on which exposure processing has been performed.

(1) Configuration of Development Device

Figure 1:
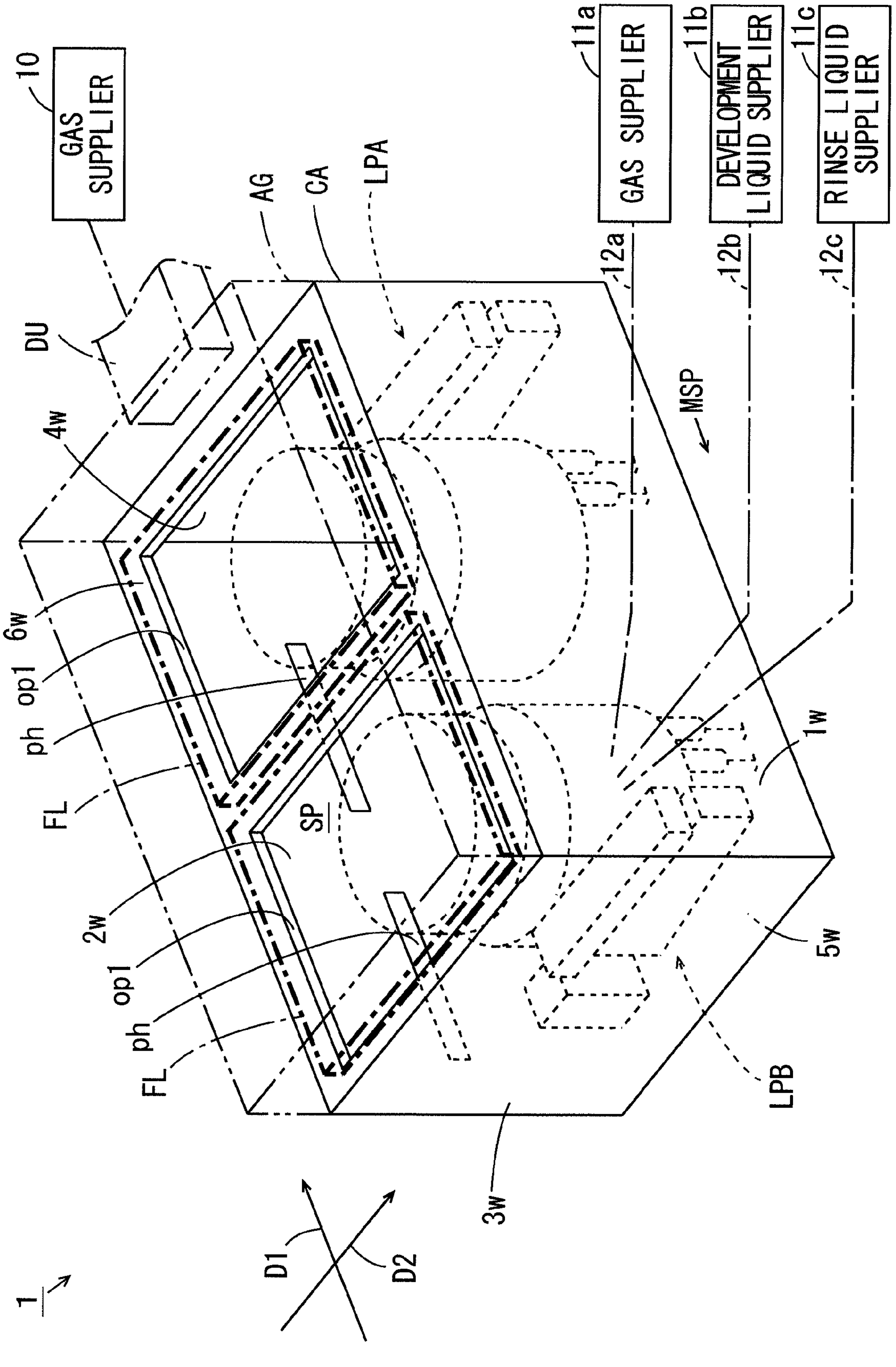
FIG. 1 is a schematic perspective view for explaining the schematic configuration of a development device according to one embodiment of the present invention.

FIG. 1 is a schematic perspective view for explaining the schematic configuration of a development device according to one embodiment of the present invention. As shown in FIG. 1, the development device 1 basically has the configuration in which two liquid processing units LPA, LPB are contained in a casing CA. In FIG. 1, the schematic shapes of the two liquid processing units LPA, LPB are indicated by the dotted lines. Details of the configuration of the liquid processing units LPA, LPB will be described below.

The casing CA has a substantially cuboid box shape extending in one direction in a horizontal plane. Specifically, a first sidewall plate 1*w*, a second sidewall plate 2*w*, a third sidewall plate 3*w*, a fourth sidewall plate 4*w*, a bottom plate 5*w* and a top plate 6*w* are attached to a frame (not shown) to form the casing CA. In the following description, a direction parallel to the direction in which the casing CA extends in a horizontal plane is suitably referred to as a first direction D1, and a direction orthogonal to the first direction D1 in a horizontal plane is suitably referred to as a second direction D2. The two liquid processing units LPA, LPB are arranged on the bottom plate 5*w* so as to be aligned in the first direction D1 in the casing CA.

The first and second sidewall plates 1*w*, 2*w* have a rectangular plate shape and are provided so as to be parallel to the vertical direction and the first direction D1 and face each other. The third and fourth sidewall plates 3*w*, 4*w* have a rectangular plate shape and are provided so as to be parallel to the vertical direction and the second direction D2 and face each other.

In the second sidewall plate 2*w*, two carry-in carry-out ports ph for transporting a substrate between the inside and outside of the casing CA are formed. The two carry-in carry-out ports ph are respectively formed in two portions opposite to the liquid processing units LPA, LPB in the second direction D2 in the second sidewall plate 2*w*. In the top plate 6*w*, two openings op1 are formed to be aligned in the first direction D1. The aperture ratio of the two openings op1 in the top plate 6*w* is set as sufficiently large as the aperture ratio of when the entire upper end of the casing CA is opened upwardly.

Two filters FL are provided above the top plate 6*w* so as to respectively close the two openings op1 of the top plate 6*w*. The two filters FL may be provided immediately below the top plate 6*w*. In FIG. 1, the two filters FL are indicated by the thick one-dot and dash lines. The two filters FL are ULPA (Ultra-Low Penetration Air) filters, for example, and are attached to a frame (not shown) that constitutes the casing CA or the top plate 6*w*. An air guide AG is provided on the top plate 6*w* of the casing CA so as to surround the two filters FL. In FIG. 1, the air guide AG is indicated by the two-dots and dash lines.

The casing CA is adjacent to a maintenance space MSP. The maintenance space MSP is located opposite to an inner space SP including the liquid processing units LPA, LPB with the first sidewall plate 1*w* interposed therebetween. The maintenance space MSP is adjacent to the inner space SP in the second direction D2. Therefore, during maintenance of the development device 1, a user or an inspector can access the inner space SP while being in the maintenance space MSP. The first sidewall plate 1*w* is configured such that the user or the inspector can easily detach the first sidewall plate 1*w* while being in the maintenance space MSP.

A gas supplier 10 is provided outside of the casing CA. The gas supplier 10 is an air control unit, for example, and regulates the conditions of air such as a temperature and humidity so as to satisfy a predetermined condition during power-on of the development device 1. Further, the gas supplier 10 supplies air the conditions of which are regulated to the air guide AG through a duct DU. In this case, the air guide AG guides the air supplied from the gas supplier 10 to the two openings op1 of the top plate 6*w* through the two filters FL. Thus, a clean air the temperature, humidity and the like of which are regulated is supplied into the casing CA, and a downward airflow is generated in an entire inner space SP of the casing CA.

A gas supplier 11*a*, a development liquid supplier 11*b* and a rinse liquid supplier 11*c* are provided outside of the casing CA. While the gas supplier 11*a*, the development liquid supplier 11*b* and the rinse liquid supplier 11*c* are connected to the liquid processing unit LPB in FIG. 1 by way of example, another gas supplier 11*a*, another development liquid supplier 11*b* and another rinse liquid supplier 11*c* are also connected to the liquid processing unit LPA. The gas supplier 11*a* includes a gas supply source. Thus, a gas is supplied to the liquid processing units LPA, LPB through a gas supply path 12*a*. The development liquid supplier 11*b* includes a development liquid supply source. Therefore, a development liquid is supplied to the liquid processing units LPA, LPB through a development liquid supply path 12*b*. The rinse liquid supplier 11*c* includes a rinse liquid supply source. Thus, a rinse liquid is supplied to the liquid processing units LPA, LPB through a rinse liquid supply path 12*c*. In FIG. 1, the gas supply path 12*a*, the development liquid supply path 12*b* and the rinse liquid supply path 12*c* are indicated by the one-dot and dash lines. In the present embodiment, the gas supply path 12*a*, the development liquid supply path 12*b* and the rinse liquid supply path 12*c* are constituted by one or a plurality of pipes, valves and the like.

(2) Configuration of Liquid Processing Units

The two liquid processing units LPA, LPB of FIG. 1 basically have the same configuration except that parts of constituent elements are provided to be symmetrical to each other with respect to a plane (vertical plane) orthogonal to the first direction D1. Therefore, the configuration of the liquid processing unit LPB out of the two liquid processing units LPA, LPB will be described representatively in the following description unless otherwise specified.

Figure 2:
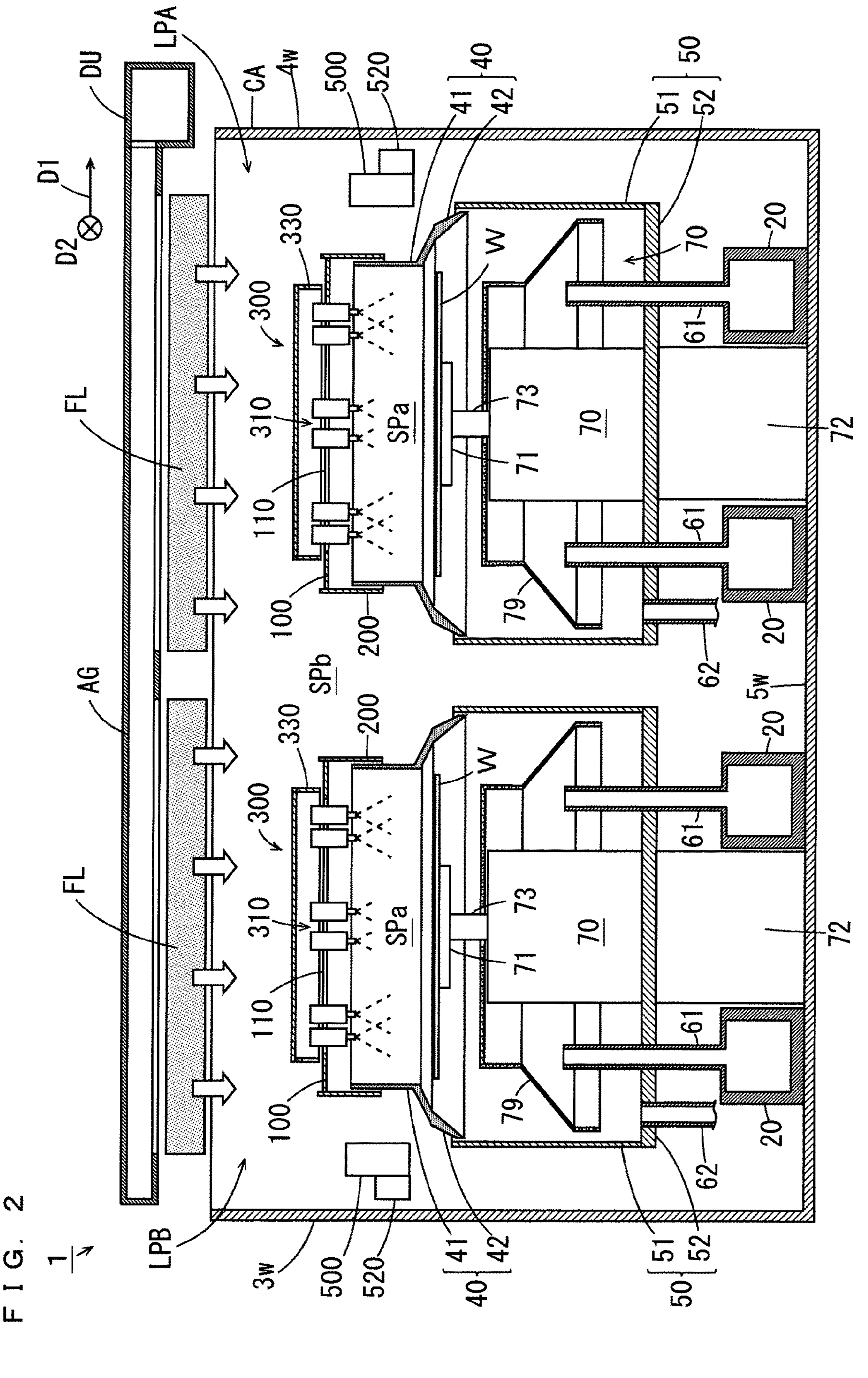
FIG. 2 is a schematic cross sectional view for explaining the configuration of part of liquid processing units.

FIG. 2 is a schematic cross sectional view for explaining the configuration of part of the liquid processing units LPA, LPB. As shown in FIG. 2, the liquid processing unit LPB includes a partition plate 100, a cylindrical member 200, a cup 40, a container 50 and an exhaust duct 20.

In the casing CA, the container 50 is fixed onto the bottom plate 5*w*. The container 50 includes a sidewall portion 51 and a bottom portion 52. The sidewall portion 51 has an annular horizontal cross section, and is formed to extend in the vertical direction while having a constant inner diameter and a constant outer diameter. The bottom portion 52 is formed so as to close the lower end of the sidewall portion 51.

Three through holes are formed in the bottom portion 52. An exhaust pipe 61 is connected to each of the portions of the bottom portion 52 in which two out of three through holes are formed. The upper end (opening end) of the exhaust pipe 61 is located farther upwardly than the bottom portion 52. The lower end of the exhaust pipe 61 is connected to the exhaust duct 20 for guiding an atmosphere in the casing CA to an exhaust device X1 (not shown) provided outside of the casing CA. The exhaust duct 20 is located below the bottom portion 52 of the container 50. Details of the exhaust duct 20 will be described below.

A drain pipe 62 is further connected to the portion of the bottom portion 52 in which the remaining one out of the three through holes is formed. During the development processing for the substrate W, the drain pipe 62 guides liquids (a development liquid and a rinse liquid) flowing from the cup 40 to the bottom portion of the container 50 to a drain device (not shown) provided outside of the casing CA. In the container 50, the end portion (opening end) of the drain pipe 62 is located at the same height as the upper surface of the bottom portion 52 and is located farther downwardly than the end portion of the exhaust pipe 61.

In each of the liquid processing units LPA, LPB, the lower portion of the spin motor 72 projects farther downwardly than the bottom portion 52 of the container 50. Therefore, a circular opening for containing the lower portion of the spin motor 72 is formed in the bottom portion 52. Thus, the spin motor 72 and the bottom portion 52 are prevented from interfering with each other.

At least part of a substrate holding device 70 is contained in the container 50. Specifically, the substrate holding device 70 includes a suction holder 71, a spin motor 72 and a motor cover 79. The spin motor 72 is fixed onto the bottom portion 52 so as to be located at the center of the container 50 in a plan view. A rotation shaft 73 is provided at the spin motor 72 to extend upwardly. The suction holder 71 is provided at the upper end of the rotation shaft 73. The suction holder 71 projects farther upwardly than the upper end of the container 50.

A suction device (not shown) is provided outside of the container 50. The suction holder 71 is configured to be capable of sucking the center portion of the back surface of the substrate W when the suction device works. The suction holder 71 sucks the center portion of the back surface of the substrate W, so that the substrate W is held in a horizontal attitude at a position above the container 50. Further, the spin motor 72 works with the substrate W held by suction by the suction holder 71, so that the substrate W is rotated in a horizontal attitude.

The motor cover 79 substantially has a bowl shape, and is fixed to the container 50 such that the portion that is opened and has a large diameter is directed downwardly. With the rotation shaft 73 inserted into the through hole in the center portion of the upper end of the motor cover 79, the motor cover 79 covers the upper end portion of the spin motor 72 excluding the rotation shaft 73 and the space having a constant width and surrounding the spin motor 72 in a horizontal plane from above. A gap having a constant width is formed between the outer peripheral end portion of the motor cover 79 and the inner peripheral surface of the sidewall portion 51.

Here, the upper end portion of the above-mentioned exhaust pipe 61 is located inwardly of the motor cover 79 and farther upwardly than the lower end of the motor cover 79 in a side view. This prevents the liquids (the development liquid and the rinse liquid) falling from above the container 50 from entering the exhaust pipe 61 during the development processing for the substrate W.

At least the lower end of the cup 40 is contained in the container 50 in addition to part of the substrate holding device 70. Here, the cup 40 is configured to be movable in the vertical direction in the container 50. Further, the cup 40 includes a cylindrical wall portion 41 and a liquid receiving portion 42. Each of the cylindrical wall portion 41 and the liquid receiving portion 42 has an annular horizontal cross section and is provided to extend at least in the vertical direction. The cup 40 is configured to surround the substrate holding device 70 in a plan view.

The outer diameter and the inner diameter of the liquid receiving portion 42 gradually increase downwardly from the upper end of the liquid receiving portion 42. The outer diameter of the lower end of the liquid receiving portion 42 (the largest outer diameter of the liquid receiving portion 42) is smaller than the inner diameter of the sidewall portion 51 of the container 50. Therefore, a gap having a constant width is formed between the outer peripheral end portion of the liquid receiving portion 42 and the inner peripheral surface of the sidewall portion 51. The cylindrical wall portion 41 has a constant inner diameter and a constant outer diameter and is formed to extend upwardly from the upper end of the liquid receiving portion 42.

The cylindrical member 200 has a cylindrical shape and is fixed to part of the casing CA via a bracket (not shown). The inner diameter of the cylindrical member 200 is larger than the outer diameter of the cylindrical wall portion 41 of the cup 40. The partition plate 100 has a substantially disc shape and is attached to the cylindrical member 200 so as to come into contact with the entire inner peripheral surface of the cylindrical member 200 in the vicinity of the upper end portion of the cylindrical member 200. An oblong nozzle opening 110 extending in the first direction D1 is formed in the substantially center portion of the partition plate 100. The nozzle opening 110 is opposite to the center portion of the substrate W held by the substrate holding device 70 during the development processing for the substrate W. A plurality of through holes (not shown) are formed in the partition plate 100 so as to be dispersed over the entire partition plate 100 except for the nozzle opening 110.

The lifting-lowering driver (not shown) is provided in the vicinity of the container 50 in the casing CA. The lifting-lowering driver includes a driving mechanism such as a motor or an air cylinder, and changes the cup 40 between a first state and a second state by supporting the cup 40 and vertically moving the cup 40. Here, the first state is a state in which the cup 40 is lowered to a position inward of the container 50. The second state is a state in which the upper end of the cup 40 is lifted to a position higher than the lower end of the cylindrical member 200 (the state of FIG. 2).

In the development device 1, the cup 40 is kept in the first state when the substrate W is carried into or carried out from the liquid processing unit LPA, LPB. Thus, the substrate W carried in from the outside of the development device 1 can be placed on the suction holder 71 of the liquid processing unit LPA, LPB. Further, the substrate W placed on the suction holder 71 of the liquid processing unit LPA, LPB can be taken out to be carried out from the development device 1.

When the cup 40 is in the second state, the inner peripheral surface of the liquid receiving portion 42 of the cup 40 surrounds the substrate W held by the substrate holding device 70 in a horizontal plane. Thus, large portions of the development liquid and the rinse liquid supplied to the substrate W from the plurality of nozzles 310 during the development processing for the substrate W are received by the inner peripheral surface of the liquid receiving portion 42 and guided to the container 50.

On the other hand, during the development processing for the substrate W held by the substrate holding device 70, in each of the liquid processing units LPA, LPB, the cup 40 is kept in the second state, and the cover member 330 covers the nozzle opening 110 of the partition plate 100. Thus, the inner space SP of the casing CA is partitioned into processing spaces SPa and a non-processing space SPb by the partition plates 100, the cylindrical members 200, the cover members 330, the cups 40 and the containers 50 of the liquid processing units LPA, LPB. Each processing space SPa is a space including the substrate W held by each substrate holding device 70, and the non-processing space SPb is a space surrounding the processing spaces SPa. The processing space SPa is a space in which a processing liquid is supplied from the plurality of nozzles 310 to the substrate W.

Figure 3:
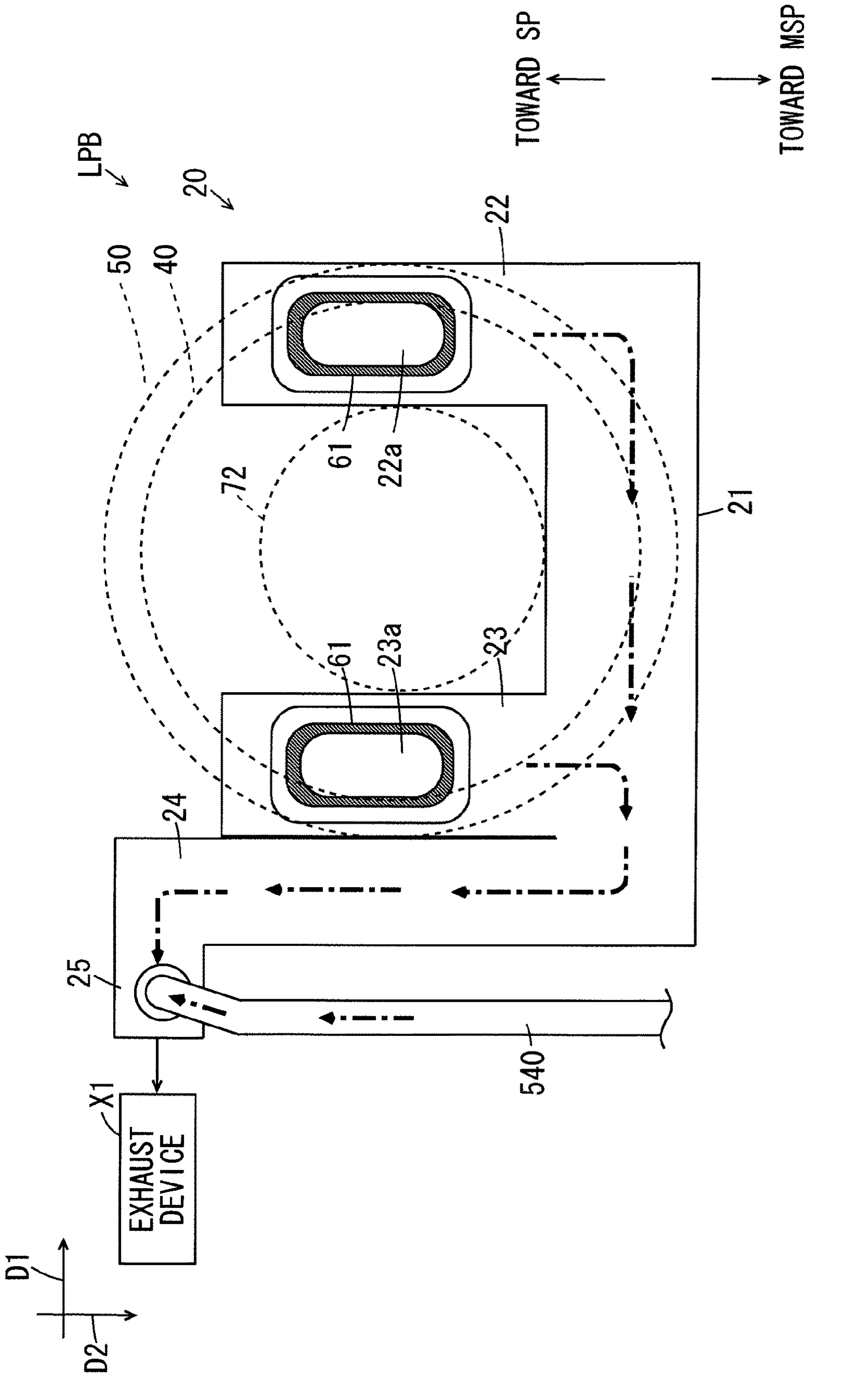
FIG. 3 is a plan view for explaining the configuration of an exhaust duct.

FIG. 3 is a plan view for explaining the configuration of the exhaust duct 20. In FIG. 3, the outer edges of the cup 40, the container 50 and the spin motor 72 of the liquid processing unit LPB are indicated by the dotted lines. As shown in FIG. 3, the exhaust duct 20 includes exhaust-pipe path portions 21 to 25, and forms an exhaust flow path for exhausting a gas in the cup 40.

The exhaust-pipe path portion 21 extends in the first direction D1 and is provided at a position spaced apart from the spin motor 72 in the second direction D2. The exhaust-pipe path portion 22 and the exhaust-pipe path portion 23 extend in the second direction D2 and are provided so as to be opposite to each other with the spin motor 72 interposed therebetween. The downstream end portion of the exhaust-pipe path portion 22 is connected to the upstream end portion of the exhaust-pipe path portion 21. The downstream end portion of the exhaust-pipe path portion 22 is connected between the upstream end portion and the downstream end portion of the exhaust-pipe path portion 21. Oblong openings 22*a*, 23*a* are respectively formed in the upper surfaces of the upstream end portions of the exhaust-pipe path portions 22, 23. The lower end portions of the two exhaust pipes 61 (FIG. 2) are respectively connected to the openings 22*a*, 23*a*.

The exhaust-pipe path portion 24 extends in the second direction D2. The upstream end portion of the exhaust-pipe path portion 24 is connected to the downstream end portion of the exhaust-pipe path portion 21. The connection portion between the downstream end portion of the exhaust-pipe path portion 21 and the upstream end portion of the exhaust-pipe path portion 24 is bent by a predetermined angle (90 degrees in the present example). The exhaust-pipe path portion 25 extends in the first direction D1. The upstream end portion of the exhaust-pipe path portion 25 is connected to the downstream end portion of the exhaust-pipe path portion 24. The connection portion between the upstream end portion of the exhaust-pipe path portion 25 and the downstream end portion of the exhaust-pipe path portion 24 is bent by a predetermined angle (90 degrees in the present example). The downstream end portion of the exhaust-pipe path portion 25 is connected to the exhaust device X1 outwardly of the development device 1 (not shown). An exhaust pipe 540, described below, is connected to the upper surface of the downstream end portion of the exhaust-pipe path portion 25.

With the above-mentioned connection, a gas exhausted from the two exhaust pipes 61 is introduced into the exhaust-pipe path portions 22, 23 through the openings 22*a*, 23*a*. An exhaust gas introduced into the exhaust-pipe path portions 22, 23 flows downstream through the exhaust-pipe path portions 21, 24, 25 as indicated by the thick one-dot and dash line in FIG. 3. In the present embodiment, the exhaust device X1 is configured to always be in operation during running of the development device 1. Therefore, a gas in the container 50 is always guided to the exhaust device X1 during running of the development device 1.

The exhaust duct 20 is slidable in the second direction D2 without interfering with the spin motor 72 because an exhaust-pipe path portion is not arranged at a position farther than the spin motor 72 in the direction opposite to the second direction D2. Therefore, the user can detach the exhaust duct 20 from the casing CA of the development device 1 by sliding the exhaust duct 20 toward the maintenance space MSP.

Figure 4:
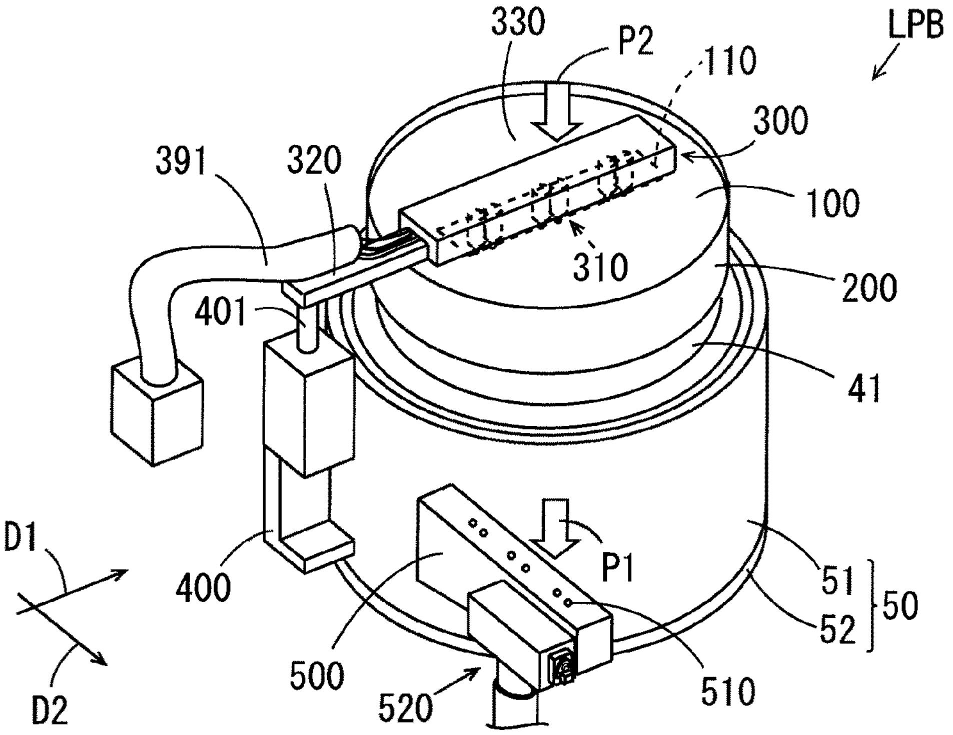
FIG. 4 is a perspective view for explaining the configuration of the liquid processing unit.

FIG. 4 is a perspective view for explaining the configuration of the liquid processing unit LPB. As shown in FIG. 4, in the casing CA of FIG. 1, the nozzle driver 400 is provided to be adjacent to the container 50 in the first direction D1. The nozzle driver 400 includes a motor having a rotation shaft 401 and an actuator. The actuator includes an air cylinder, a hydraulic cylinder, a motor or the like and supports the motor on the bottom plate 5*w* (FIG. 1) such that the motor having the rotation shaft 401 is movable in the vertical direction. The rotation shaft 401 is located at the upper end of the nozzle driver 400.

In the casing CA of FIG. 1, a nozzle container 500 is further provided on the bottom plate 5*w* (FIG. 1). The nozzle driver 400 and the nozzle container 500 are aligned in the second direction D2 close to the container 50 with a distance therebetween. The nozzle container 500 has a box shape extending by a constant length in the second direction D2. A plurality of waiting holes 510 for containing the plurality of nozzles 310, described below, are formed in the upper surface of the nozzle container 500.

A nozzle arm unit 300 is attached to the upper end portion of the rotation shaft 401 of the nozzle driver 400. The nozzle arm unit 300 has a longitudinal shape extending linearly in a direction different from the direction in which the rotation shaft 401 extends while being attached to the upper end portion of the rotation shaft 401.

The nozzle arm unit 300 is mainly constituted by the plurality (six in the present example) of nozzles 310, a support 320 and the cover member 330. In the present embodiment, a nozzle 310 includes three development liquid nozzles for supplying a development liquid to the substrate W and three rinse liquid nozzles for supplying a rinse liquid to the substrate W. In the nozzle arm unit 300, the three development liquid nozzles are arranged at predetermined intervals, and the three rinse liquid nozzles are arranged at predetermined intervals. Each of the development liquid nozzle and the rinse liquid nozzle is constituted by a two-fluid nozzle capable of injecting a liquid mixture of a liquid and a gas. Thus, a liquid mixture of a development liquid and a gas is injected from the development liquid nozzle, and a liquid mixture of a rinse liquid and a gas is injected from the rinse liquid nozzle.

When the motor of the nozzle driver 400 moves in the vertical direction, the nozzle arm unit 300 moves in the vertical direction. Further, when the motor of the nozzle driver 400 works, the nozzle arm unit 300 rotates in a horizontal plane around the rotation shaft 401. In the present embodiment, as shown in FIG. 4, the plurality of nozzles 310 of the nozzle arm unit 300 are held at a processing position P2 above the substrate W held by the substrate holding device 70 in a period during which the development processing is performed on the substrate W. FIG. 4 shows the plurality of nozzles 310 being located at the processing position P2. In FIG. 4, the waiting position P1 and the processing position P2 are respectively indicated by the outlined arrows.

Figure 5:
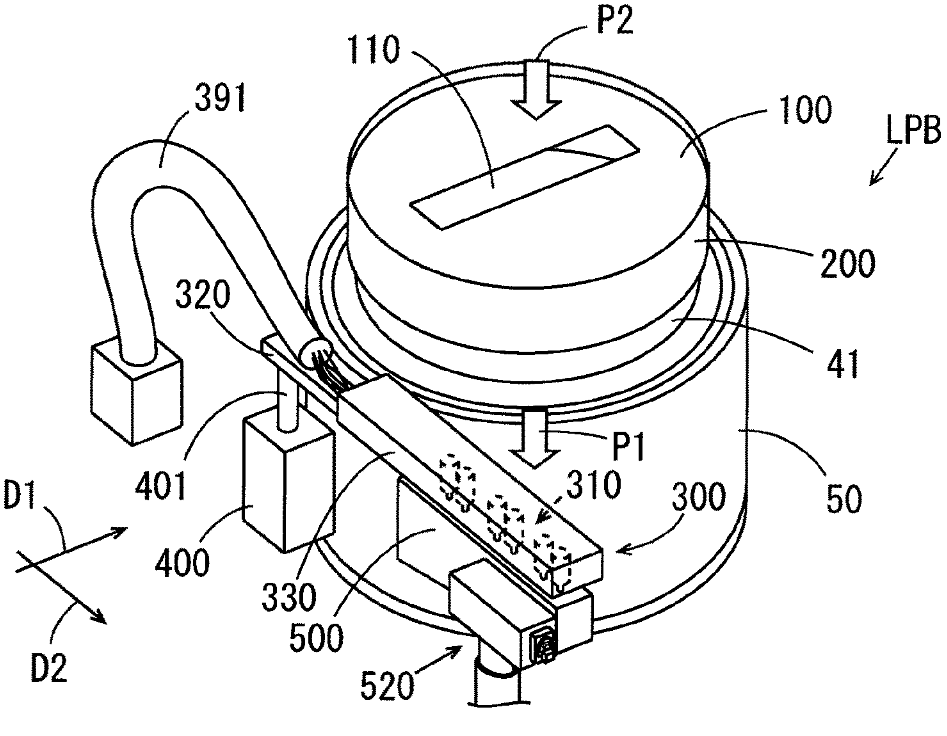
FIG. 5 is a perspective view for explaining the configuration of the liquid processing unit with a plurality of nozzles being located at a waiting position.

FIG. 5 is a perspective view for explaining the configuration of the liquid processing unit LPB with the plurality of nozzles 310 being located at the waiting position. As shown in FIG. 5, the plurality of nozzles 310 of the nozzle arm unit 300 are held at a waiting position P1 close to the substrate W held by the substrate holding device 70 in a period during which the development processing is not performed on the substrate W. In FIG. 5, the waiting position P1 and the processing position P2 are respectively indicated by the outlined arrows. In a period during which the nozzle 310 is held at the waiting position P1, the nozzle 310 is contained in the waiting hole 510 of the nozzle container 500. In the present embodiment, a liquid staying in the nozzle 310 is discharged.

A drain pipe (not shown) draining a liquid that has been injected or has fallen from the plurality of nozzles 310 to the outside of the casing CA with the nozzle arm unit 300 being located at the waiting portion P1 is connected to the nozzle container 500. Further, an exhaust flow path 520 for exhausting an atmosphere in the nozzle container 500 to the outside of the casing CA is connected to the nozzle container 500.

Figure 6:
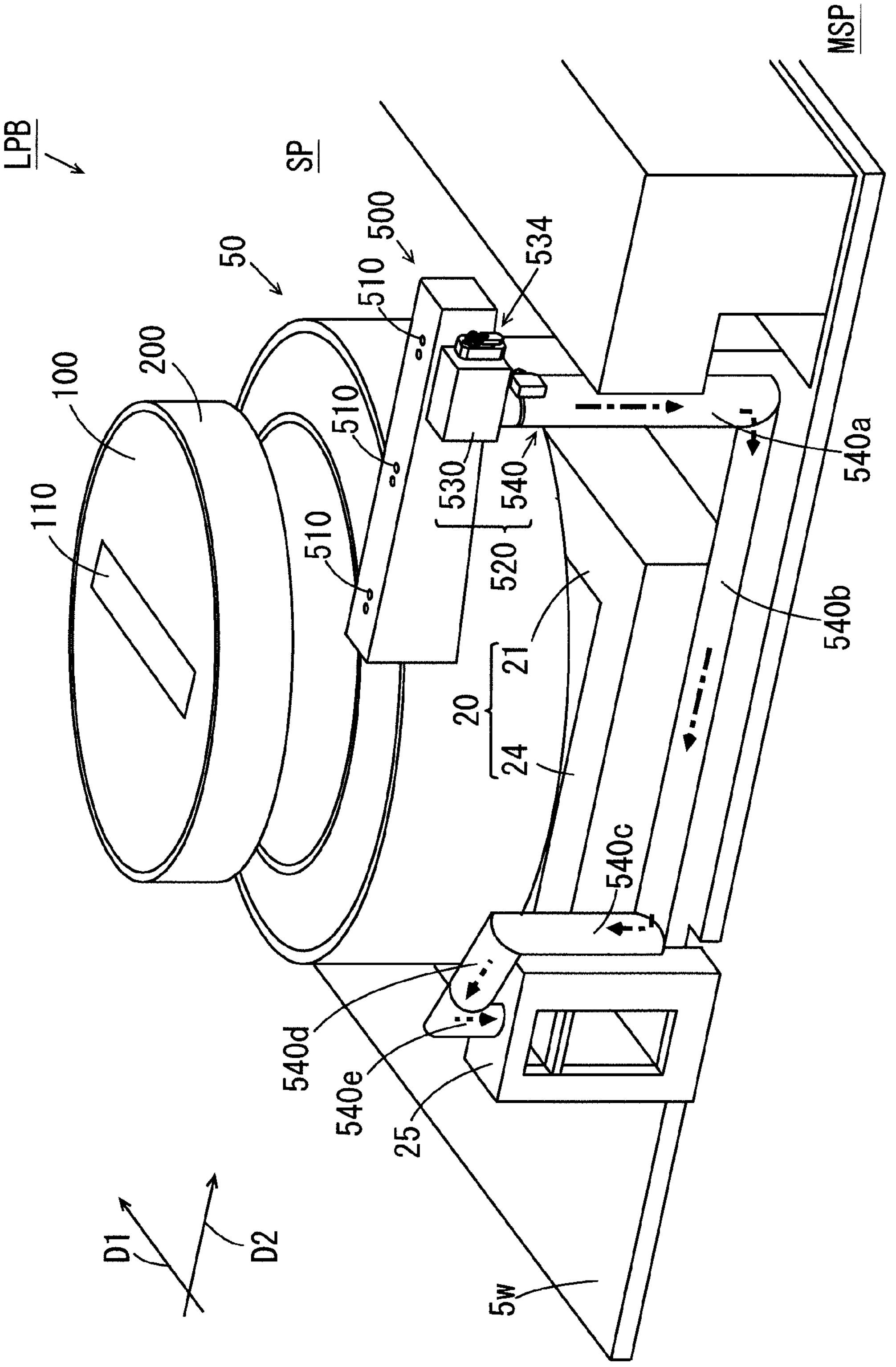
FIG. 6 is a perspective view schematically showing an entire exhaust flow path.

FIG. 6 is a perspective view schematically showing the entire exhaust flow path 520. The exhaust flow path 520 includes a flow-rate regulator 530 and an exhaust pipe 540. The exhaust flow path 520 is configured such that a gas in the nozzle container 500 is guided to the exhaust device X1 via the exhaust duct 20. In FIG. 6, a flow of gas in the exhaust flow path 520 is indicated by the one-dot and dash arrows.

The flow-rate regulator 530 is attached to a sidewall 501 of the nozzle container 500. The exhaust pipe 540 includes partial pipes 540*a* to 540*e*. The upstream end of the partial pipe 540*a* is connected to the flow-rate regulator 530. The partial pipe 540*a* extends downwardly from the upstream end. The upstream end of the partial pipe 540*b* is connected to the downstream end of the partial pipe 540*a*. The partial pipe 540*b* extends from the upstream end in parallel to the second direction D2. The upstream end of the partial pipe 540*c* is connected to the downstream end of the partial pipe 540*b*. The partial pipe 540*c* extends upwardly from the upstream end to a position above the exhaust-pipe path portion 25. The upstream end of the partial pipe 540*d* is connected to the downstream end of the partial pipe 540*c*.

The partial pipe 540*d* extends horizontally to a position overlapping with the exhaust-pipe path portion 25 in a plan view. The partial pipe 540*e* is connected to the downstream end of the partial pipe 540*d*. The partial pipe 540*e* extends downwardly from the downstream end of the partial pipe 540*d*, and is connected to the upper surface of the above-mentioned exhaust-pipe path portion 25. Because the partial pipe 540*e* is connected to the upper surface of the exhaust-pipe path portion 25, the user or the inspector can access the partial pipe 540*e* from above the exhaust-pipe path portion 25 when detaching the partial pipe 540*e* from the exhaust-pipe path portion 25. Thus, the user can easily carry out the detaching work.

Figure 7:
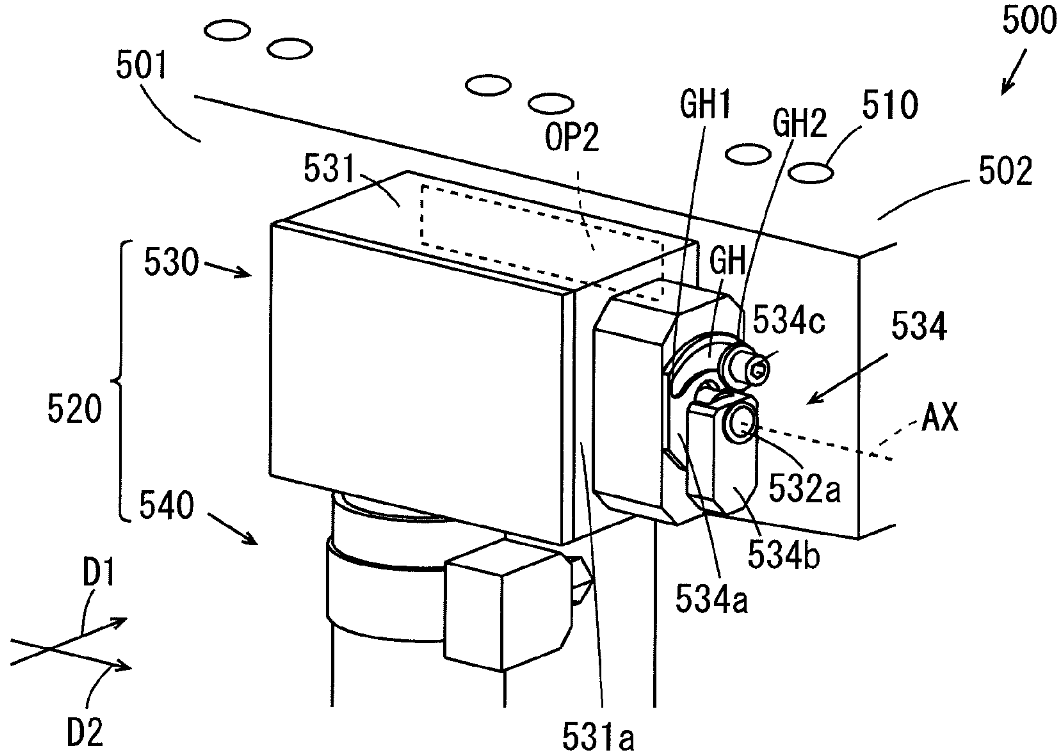
FIG. 7 is an enlarged view of a flow-rate regulator of the exhaust flow path.

FIG. 7 is an enlarged view of a flow-rate regulator of the exhaust flow path. As shown in FIG. 7, the flow-rate regulator 530 includes a flow-rate regulating casing 531. The flow-rate regulating casing 531 is connected to the sidewall 501 of the nozzle container 500. The flow-rate regulating casing 531 has a box shape extending in the second direction D2.

An operation unit 534 is provided at the side surface of the flow-rate regulating casing 531 located at a position farther in the second direction D2 than the other side surface of the flow-rate regulating casing 531. The operation unit 534 is directed toward the above-mentioned maintenance space MSP (FIG. 1). Therefore, the user or the inspector can easily access the operation unit 534.

Figure 8:
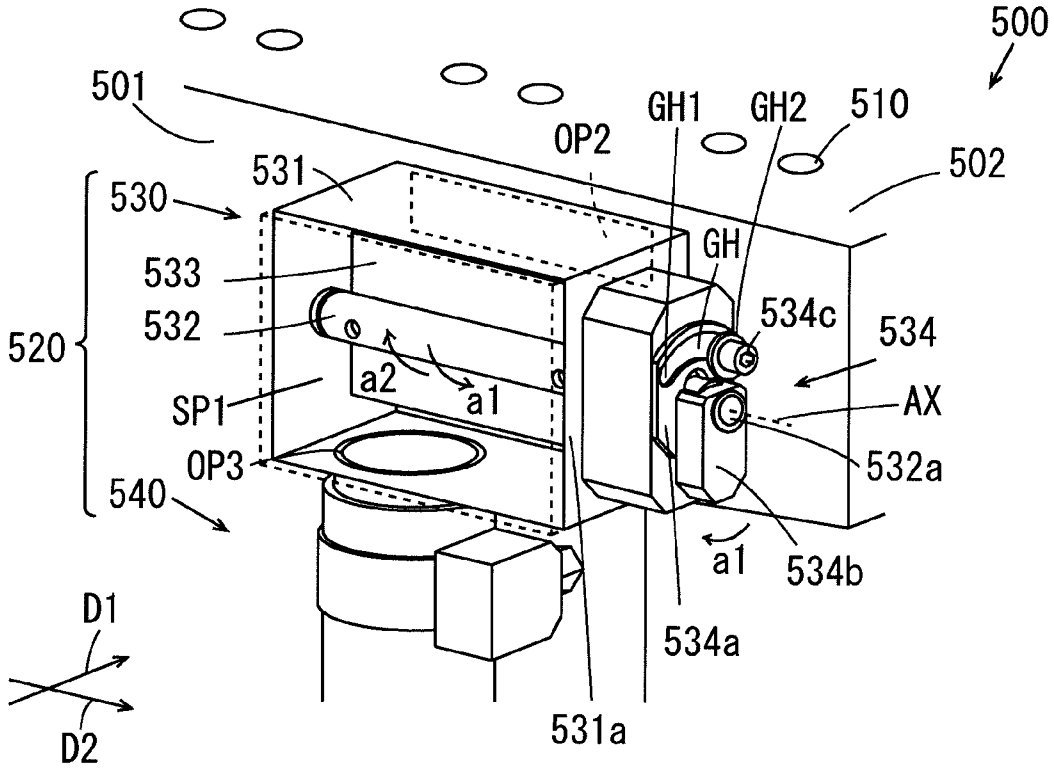
FIG. 8 is a perspective view of a flow-rate regulating casing.

FIG. 8 is a perspective view of a flow-rate regulating casing. As shown in FIG. 8, an opening OP2 is formed in the sidewall 501 of the nozzle container 500 such that a space SP2 in the nozzle container 500 and a space SP1 of the flow-rate regulating casing 531 communicate with each other. The cross sectional area of the opening OP2 is set to S2.

An opening OP3 connected to the exhaust pipe 540 is formed in the bottom portion of the flow-rate regulating casing 531. In the flow-rate regulating casing 531, a rotation shaft 532 and a pair of shielding plates 533 are provided in the space SP1. The rotation shaft 532 has a columnar shape extending parallel to the second direction D2, and is supported by a sidewall 531*a* of the flow-rate regulating casing 531 so as to be rotatable about a rotation axis AX extending parallel to the second direction D2. Further, the rotation shaft 532 is provided so as to penetrate the sidewall 531*a* of the flow-rate regulating casing 531. The pair of shielding plates (regulating plates) 533 has a flat-plate shape and is fixed to the rotation shaft 532 so as to extend outwardly from the rotation shaft 532 and in opposite directions.

The end portion of the rotation shaft 532 located farther in the D2 direction is connected to the operation unit 534. The operation unit 534 includes a guide member 534*a*, a projection member 534*b* and a fixing member 534*c*. The guide member 534*a* and the projection member 534*b* are connected to one end 532*a* of the rotation shaft 532 so as to be rotatable integrally with the rotation shaft 532. The fixing member 534*c* is a screw screwed into a screw hole formed in the flow-rate regulating casing 531.

A guide hole GH is formed in the guide member 534*a*. The guide hole GH is formed in an arc shape concentric with the rotation axis AX in order to restrict the rotation range of the rotation shaft 532. The fixing member 534*c* passes through the guide hole GH to be screwed into the guide hole GH of the flow-rate regulating casing 531. When the fixing member 534*c* is screwed into the screw hole of the flow-rate regulating casing 531 until it reaches the end of the screw hole, and is fixed, the guide member 534*a* is fixed between the fixing member 534*c* and the flow-rate regulating casing 531. In this state, because the rotation shaft 532 cannot freely rotate, the rotation position of the rotation shaft 532 is fixed.

On the other hand, in a case in which the fixing member 534*c* is not screwed into the screw hole until it reaches the end of the screw hole, and the screwing amount is small, the guide member 534*a* is not fixed between the fixing member 534*c* and the flow-rate regulating casing 531. That is, the rotation shaft 532 is freely rotatable. The user or the inspector can change the rotation position of the rotation shaft 532 by operating the projection member 534*b*.

Figure 9:
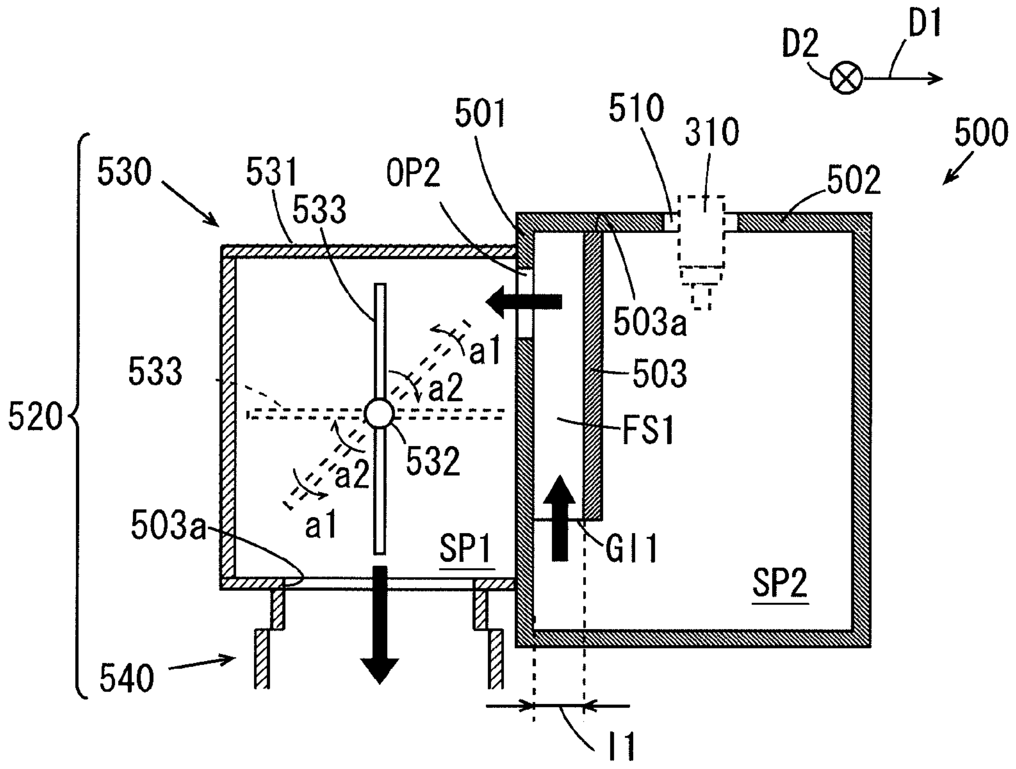
FIG. 9 is a cross sectional view of a nozzle container and the flow-rate regulating casing as viewed in a second direction.

FIG. 9 is a cross sectional view of the nozzle container and the flow-rate regulating casing as viewed in the second direction D2. FIG. 9 shows the nozzle 310 being contained in the waiting hole 510 of the nozzle container 500. When the rotation shaft 532 is rotated about the rotation axis AX in the direction of the arrow a1, the shielding plate 533 is parallel to the vertical direction as indicated by the solid lines in FIG. 9. The position of the shielding plate 533 indicated by the solid lines in FIG. 9 represents the position at which the shielding plate 533 is located in a case in which the fixing member 534*c* is located at another end GH2 (see FIG. 8) of the guide hole GH.

When the rotation shaft 532 is rotated about the rotation axis AX in the direction of the arrow a2, the shielding plate 533 is parallel to the first direction D1 as indicated by the dotted lines in FIG. 9. The position of the shielding plate 533 indicated by the dotted lines in FIG. 9 represents a position at which the shielding plate 533 is located in a case in which the fixing member 534*c* is located at another end GH1 (see FIG. 8) of the guide hole GH. In the space SP1 of the flow-rate regulating casing 531, the shielding plate 533 is arranged between the opening OP2 and the opening OP3. Therefore, when the rotation angle of the rotation shaft 532 is changed, the cross sectional area of the flow path extending from the opening OP2 to the opening OP3 is changed. The cross sectional area of the flow path connecting the opening OP2 to the opening OP3 is defined in accordance with the rotation angle of the rotation shaft 532.

In a case in which the shielding plate 533 is parallel to the first direction D1, the cross sectional area of the flow path connecting the opening OP2 to the opening OP3 is minimized. On the other hand, in a case in which the shielding plate 533 is parallel to the vertical direction, the cross sectional area of the flow path connecting the opening OP2 to the opening OP3 is maximized.

In this manner, an amount of gas guided from the space SP2 of the nozzle container 500 to the space SP1 of the flow-rate regulating casing 531 can be regulated by the rotation angle of the rotation shaft 532. In other words, it is possible to regulate the flow rate of a gas guided from the space SP2 of the nozzle container 500 to the exhaust pipe 540 by adjusting the positions of the guide member 534*a* and the projection member 534*b* of FIG. 8. Because the positions of the guide member 534*a* and the fixing member 534*c* relative to each other represent the rotation angle of the rotation shaft 532, the user or the inspector can confirm the rotation angle of the rotation shaft 532, in other words, the cross sectional area of the flow path extending from the opening OP2 to the opening OP3, based on the positions of the guide member 534*a* and the fixing member 534*c* relative to each other.

In the space SP2 of the nozzle container 500, a flow-path forming member 503 is arranged at a position opposite to the opening OP2 of the sidewall 501 so as to cover the opening OP2.

An upper end 503*a* of the flow-path forming member 503 is fixed to the inner surface of a top plate 502 of the nozzle container 500. The flow-path forming member 503 is formed so as to extend from the top plate 502 of the nozzle container 500 to a position lower than the opening OP2 of the nozzle container 500 and the lower end of the nozzle 310 being contained in the nozzle container 500. This suppresses the entry of a mist-like processing liquid discharged from the nozzle 310 to the flow-rate regulator 530 and the exhaust pipe 540. Further, a gas inlet port GI1 is directed downwardly in a flow-path space FS1. Because being heavier than air, a gas including a development liquid is accumulated in a lower portion in the space SP2 of the nozzle container 500. Therefore, the gas including a development liquid can be efficiently exhausted.

Figure 10:
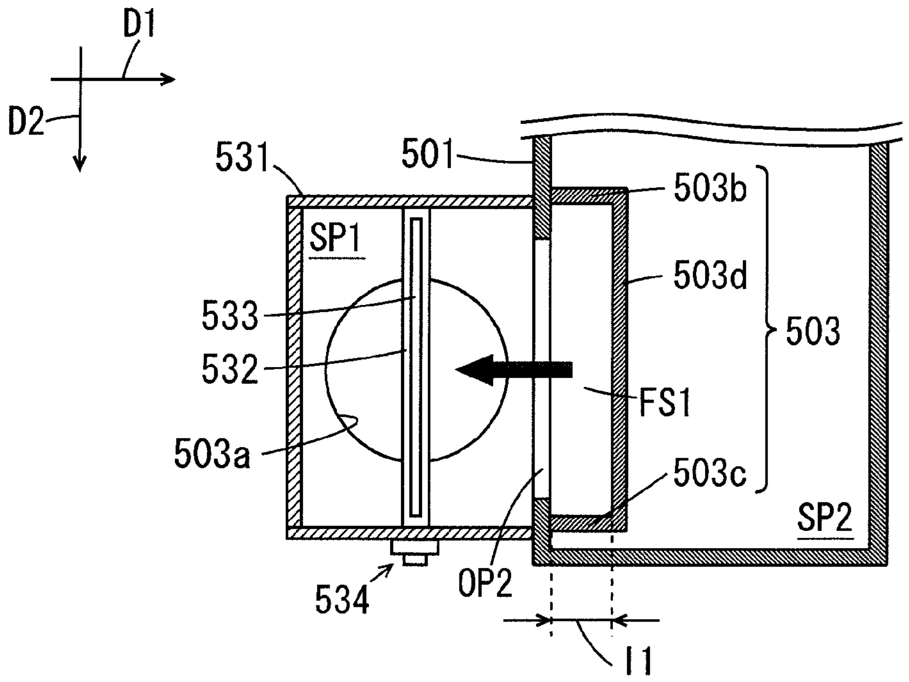
FIG. 10 is a cross sectional view of a portion of the nozzle container and the flow-rate regulating casing as viewed from above.

FIG. 10 is a cross sectional view of a portion of the nozzle container and the flow-rate regulating casing as viewed from above. The flow-path forming member 503 is fabricated by suitably bending of a sheet of metal plate that is a flat plate-shaped member, for example. As shown in FIG. 10, the flow-path forming member 503 has a center portion 503*d*, and end portions 503*b*, 503*c* connected to the both ends of the center portion. The end portions 503*b*, 503*c* are connected so as to intersect with the center portion 503*d* from both ends of the center portion 503*d* (by 90 degrees in the present example). The end portions 503*b*, 503*c* of the flow-path forming member 503 are fixed to the inner surface of the sidewall 501 of the nozzle container 500. The center portion 503*d* of the flow-path forming member 503 is spaced apart from the inner surface of the sidewall 501 in which the opening OP2 is formed by a distance 11.

The flow-path forming member 503 divides the space SP2 of the nozzle container 500 into the flow-path space FS1 and the other space. The flow-path space FS1 communicates with the other space of the space SP2 through the gas inlet port Gil equivalent to the upstream end, and communicates with the space SP1 of the flow-rate regulating casing 531 through the opening OP2 equivalent to the downstream end. It is preferable that the cross sectional area of the gas inlet port Gil is set smaller than a cross sectional area S2 of the opening OP2. In this case, the flow rate in the gas inlet port Gil can be made higher than the flow rate in the opening OP2. This can improve efficiency of suction of a gas in the space SP2 of the nozzle container 500. Further, because the gas inlet port Gil is directed downwardly in the flow-path space FS1, a gas including a development liquid can be efficiently exhausted.

(3) Effects of Embodiments

With the development device 1 of the above-mentioned embodiment, an atmosphere in the liquid processing units LPA, LPB is guided to the exhaust device X1 through the exhaust duct 20. Further, an atmosphere in the space SP2 of the nozzle container 500 is guided to the exhaust device X1 through the exhaust pipe 540 and the exhaust duct 20. Therefore, it is possible to exhaust an atmosphere in the liquid processing units LPA, LPB and an atmosphere in the space SP2 of the nozzle container 500 to the outside of the development device 1 with use of the single exhaust device X1. As a result, it is possible to easily regulate an exhaust amount of the device as a whole. Further, because it is not necessary to provide an independent exhaust device for each of the liquid processing units LPA, LPB and the nozzle container 500, an increase in size of the device is suppressed.

Further, the flow-rate regulator 530 is provided in the exhaust flow path 520 for exhausting an atmosphere in the space SP2 of the nozzle container 500. Thus, the exhaust amount of an atmosphere flowing through the exhaust flow path 520 is regulated. In a case in which the exhaust amount of an atmosphere in the liquid processing units LPA, LPB and the nozzle container 500 is restricted by the single exhaust device X1, the exhaust amount of an atmosphere in the nozzle container 500 can be regulated. Thus, it is possible to ensure the flow rate required for exhausting an atmosphere in the liquid processing units LPA, LPB. As a result, leakage of an atmosphere into the inner space SP of the casing CA is further suppressed.

(4) Other Embodiments

While the flow-rate regulator 530 is provided to be located between the nozzle container 500 and the exhaust pipe 540 in the above-mentioned embodiment, the present invention is not limited to this. For example, the flow-rate regulator 530 may be provided so as to be interposed in the exhaust pipe 540 for guiding an atmosphere in the space SP2 of the nozzle container 500 to the exhaust device X1. Further, a flow-rate regulating valve such as a control valve may be used as the flow-rate regulator 530.

While the flow rate of a gas in the exhaust flow path 520 is regulated by a user operation of the operation unit 534 of the flow-rate regulator 530 in the above-mentioned embodiment, the present invention is not limited to this. For example, the flow rate of a gas in the exhaust flow path 520 may be automatically regulated.

Figure 11:
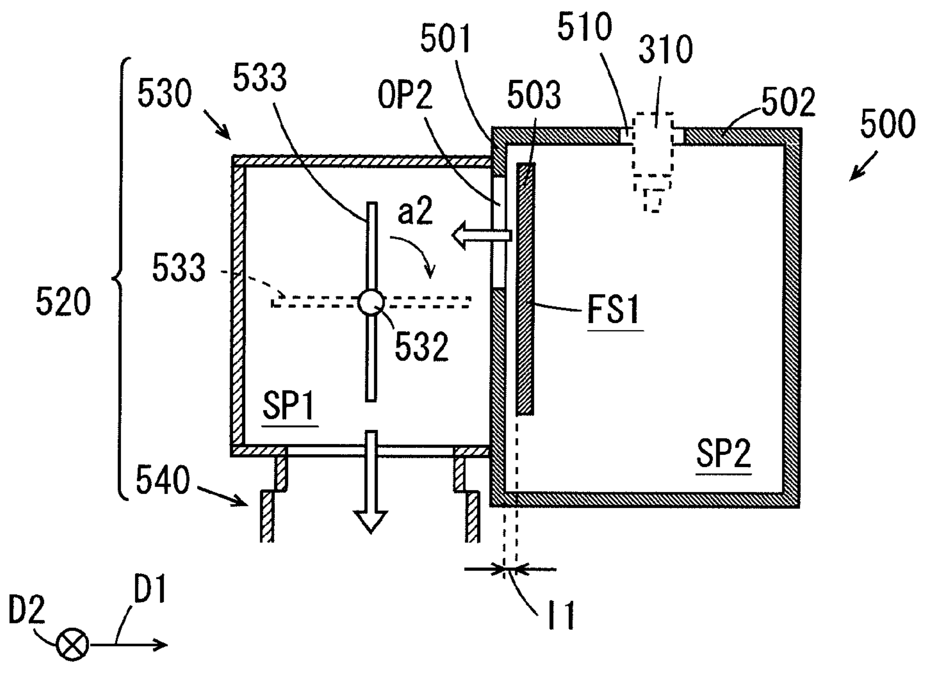
FIG. 11 is a schematic cross sectional view showing the configuration of a nozzle container according to another embodiment.

In FIG. 9 of the above-mentioned embodiment, the flow-path forming member 503 is connected to the top plate 502 and the sidewall 501, so that the flow-path space FS1 is formed of the sidewall 501, the top plate 502 and the flow-path forming member 503. However, the present invention is not limited to this. FIG. 11 is a schematic cross sectional view showing the configuration of a nozzle container 500 according to another embodiment. As shown in FIG. 11, a flow-path forming member 503 may have a flat-plate shape and may be supported by a support member (not shown). For example, the flow-path forming member 503 may be fixed to the sidewall 501 by a support member extending from the sidewall 501. The distance 11 between the sidewall 501 and the flow-path forming member 503 may be set such that the cross sectional area of a gas flowing between the sidewall 501 and the flow-path forming member 503 is smaller than the cross sectional area of the opening OP2. In this case, the efficiency of suction of a gas in the space SP2 of the nozzle container 500 can be improved. Further, because the flow-path forming member 503 is supported by the support member, it is not necessary to connect the flow-path forming member 503 to the sidewall 501 or the top plate 502. Therefore, the nozzle container 500 can be easily fabricated.

(5) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the nozzle driver 400 is an example of a mover, the exhaust duct 20 is an example of a first exhaust flow path, the exhaust flow path 520 is an example of a second exhaust flow path and the flow-path space FS1 is an example of a third exhaust flow path.

(6) Overview of Embodiments (Item 1) A substrate processing apparatus according to one aspect includes a nozzle that supplies a processing liquid to a substrate, a mover that moves the nozzle between a supply position above the substrate and a waiting position outward of the substrate, a nozzle container that is located at the waiting position and contains the nozzle, a first exhaust flow path that guides a gas in a processing space in which a processing liquid is supplied to the substrate to an exhaust device, and a second exhaust flow path that guides a gas in the nozzle container to the first exhaust flow path.

With the substrate processing apparatus according to item 1, a gas in the processing space is guided to the exhaust device through the first exhaust flow path. Further, a gas in the nozzle container is guided to the exhaust device through the second exhaust flow path and the first exhaust flow path. Therefore, it is possible to exhaust a gas including a processing liquid in the nozzle container and a gas including a processing liquid in the processing space to the outside by using the single exhaust path. As a result, it is possible to easily regulate the exhaust amount of the device as a whole.

(Item 2) The substrate processing apparatus according to item 1 may further include a flow-rate regulator that regulates a flow rate of a gas flowing through the second exhaust flow path.

With the substrate processing apparatus according to item 2, the flow rate of a gas flowing through the second exhaust flow path is regulated by the flow-rate regulator. Therefore, even in a case in which the flow rate of a gas flowing through the first and second exhaust flow paths is restricted, the flow rate of a gas flowing through the second exhaust flow path is regulated. Therefore, it is possible to ensure a flow rate required to exhaust a gas in the processing space to the outside.

(Item 3) The substrate processing apparatus according to item 2, wherein the flow-rate regulator may further include an operation unit to be operated by a user in order to regulate the flow rate of the gas in the second exhaust flow path, and the operation unit may be provided to be directed toward a maintenance space formed to be adjacent to a casing including the nozzle container and the processing space.

With the substrate processing apparatus according to item 3, because being able to operate the operation unit from the maintenance space, the user can easily regulate the flow rate of a gas flowing through the second exhaust flow path. As a result, the maintainability of the apparatus is improved.

(Item 4) The substrate processing apparatus according to any one of items 1 to 3, wherein the nozzle container may include an opening that causes an inner space of the nozzle container and the second exhaust flow path to communicate with each other, and a flow-path forming member that is provided in the nozzle container and covers the opening.

With the substrate processing apparatus according to the item 4, because the flow-path forming member covers the opening, a flow of a gas flowing toward the opening in the nozzle container is regulated. Therefore, a gas in the nozzle container can be efficiently exhausted.

(Item 5) The substrate processing apparatus according to item 4, wherein the opening may be formed in a sidewall of the nozzle container, the flow-path forming member may be provided to partition the inner space of the nozzle container into a third exhaust flow path and another space, and the third exhaust flow path may have an exhaust port connected to the opening and an intake port that opens downwardly.

With the substrate processing apparatus according to item 5, a gas in the nozzle container is guided from a suction port directed downwardly of the third exhaust flow path to the opening through the third exhaust flow path. In this case, because a gas including the processing liquid is heavier than air, it is possible to efficiently exhaust a gas including the processing liquid in the nozzle container.

(Item 6) The substrate processing apparatus according to item 5, wherein a lower end of the flow-path forming member may be located farther downwardly than a lower end of the nozzle contained in the nozzle container.

With the substrate processing apparatus according to item 6, the flow-path forming member is located farther downwardly than the lower end of the nozzle. In this case, a flow of a processing liquid discharged from the nozzle into the second exhaust flow path through the opening can be suppressed.

With the substrate processing apparatus of the above-mentioned embodiment, because it is not necessary to provide an independent exhaust device for each of the liquid processing units LPA, LPB and the nozzle container 500, it is possible to reduce the exhaust amount for one substrate processing apparatus. As a result, unnecessary energy is not consumed, so that it is possible to contribute to save power for the user of the substrate processing apparatus. Further, in a case in which a processing liquid contains a chemical liquid, it is possible to suppress release of the chemical liquid into an atmosphere and suppress contamination of an environment.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A substrate processing apparatus comprising:

a nozzle that supplies a processing liquid to a substrate;

a mover that moves the nozzle between a supply position above the substrate and a waiting position outward of the substrate;

a nozzle container that is located at the waiting position and contains the nozzle;

a first exhaust flow path that guides a gas in a processing space in which a processing liquid is supplied to the substrate to an exhaust device; and a second exhaust flow path that guides a gas in the nozzle container to the first exhaust flow path.

2. The substrate processing apparatus according to claim 1, further comprising a flow-rate regulator that regulates a flow rate of a gas flowing through the second exhaust flow path.

3. The substrate processing apparatus according to claim 2, wherein the flow-rate regulator further includes an operation unit to be operated by a user in order to regulate the flow rate of the gas in the second exhaust flow path, and the operation unit is provided to be directed toward a maintenance space formed to be adjacent to a casing including the nozzle container and the processing space.

4. The substrate processing apparatus according to claim 1, wherein the nozzle container includes an opening that causes an inner space of the nozzle container and the second exhaust flow path to communicate with each other, and a flow-path forming member that is provided in the nozzle container and covers the opening.

5. The substrate processing apparatus according to claim 4, wherein the opening is formed in a sidewall of the nozzle container, the flow-path forming member is provided to partition the inner space of the nozzle container into a third exhaust flow path and another space, and the third exhaust flow path has an exhaust port connected to the opening and an intake port that opens downwardly.

6. The substrate processing apparatus according to claim 5, wherein a lower end of the flow-path forming member is located farther downwardly than a lower end of the nozzle contained in the nozzle container.

* * * * *